(12) United States Patent
Oulman et al.

(10) Patent No.: US 8,974,201 B2
(45) Date of Patent: Mar. 10, 2015

(54) ROTATING COMPRESSOR VALVE

(75) Inventors: Spencer T. Oulman, Houston, TX (US);
Kyle W. Sembera, Houston, TX (US);
Omar M. Kabir, Waller, TX (US);
Thomas C. Riggs, Houston, TX (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 380 days.

(21) Appl. No.: 13/403,761

(22) Filed: Feb. 23, 2012

(65) Prior Publication Data

US 2013/0220424 A1    Aug. 29, 2013

(51) Int. Cl.
*F04B 7/00*    (2006.01)

(52) U.S. Cl.
USPC ............. 417/510; 417/536; 137/625.31

(58) Field of Classification Search
CPC .................................. F04B 7/00; F04B 7/0046
USPC ................. 417/510, 536; 137/625.3, 625.31
See application file for complete search history.

(56) References Cited

U.S. PATENT DOCUMENTS

| | | | |
|---|---|---|---|
| 4,554,943 A | 11/1985 | Claney | |
| 4,554,948 A | 11/1985 | Bergmann | |
| 4,674,537 A * | 6/1987 | Bergmann | 137/625.31 |
| 6,192,922 B1 * | 2/2001 | MacGibbon et al. | 137/486 |
| 6,412,753 B2 | 7/2002 | Fujita et al. | |
| 6,422,216 B1 | 7/2002 | Lyko et al. | |
| 6,443,717 B1 * | 9/2002 | Barber | 417/510 |
| 6,726,174 B2 * | 4/2004 | Bareis et al. | 251/205 |
| 7,073,775 B2 | 7/2006 | Kabir et al. | |
| 2001/0001477 A1 * | 5/2001 | Steinebrunner et al. | 251/129.02 |
| 2006/0192343 A1 * | 8/2006 | Hashiba et al. | 277/355 |
| 2009/0175735 A1 * | 7/2009 | Torres Martinez | 417/120 |
| 2011/0260087 A1 * | 10/2011 | Perr et al. | 251/309 |

FOREIGN PATENT DOCUMENTS

| | | |
|---|---|---|
| WO | 0165157 A1 | 9/2001 |
| WO | 2011132563 A1 | 10/2011 |

OTHER PUBLICATIONS

PCT International Search Report for PCT Application No. PCT/US2012/067138 dated Mar. 7, 2013.

* cited by examiner

*Primary Examiner* — Peter J Bertheaud
*Assistant Examiner* — Dnyanesh Kasture
(74) *Attorney, Agent, or Firm* — Fletcher Yoder P.C.

(57) ABSTRACT

As described in detail below, the disclosed embodiments include a rotating compressor valve having stationary front and rear plates (e.g., guards) and a rotating plate configured to rotate relative to the stationary front and rear plates. The stationary front and rear plates and the rotating plate all include a plurality of slots which, when aligned, allow a process fluid (e.g., natural gas) to flow through the rotating compressor valve. In certain embodiments, the slots of the rotating plate include an arc radius that is smaller than an arc radius of the slots of the stationary front and rear plates.

24 Claims, 9 Drawing Sheets

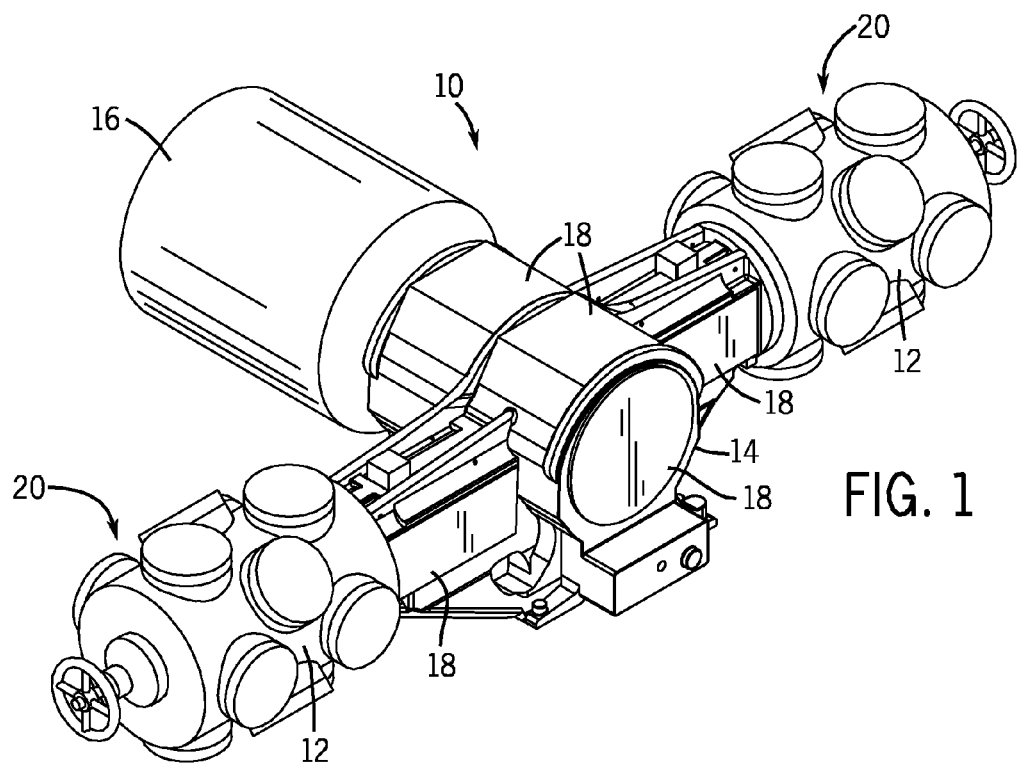
FIG. 1
FIG. 2
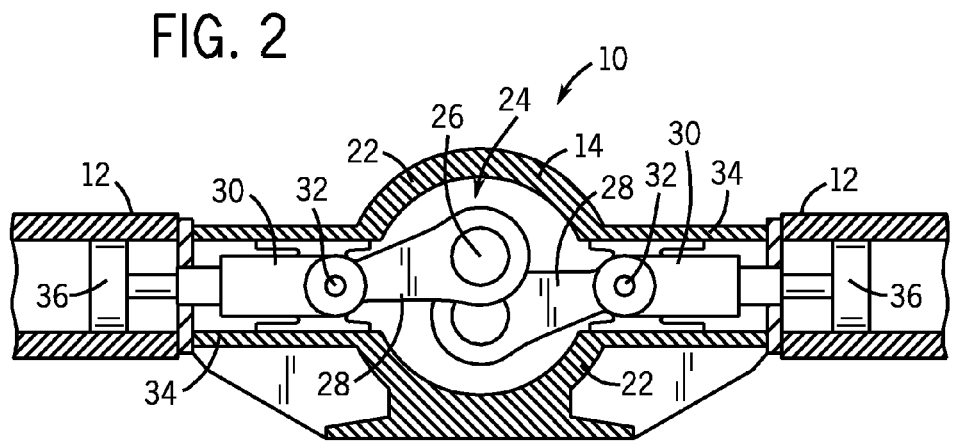

ROTATING COMPRESSOR VALVE

FIELD OF THE INVENTION

The present invention relates generally to reciprocating machinery, such as reciprocating compressors. More particularly, the present invention relates to a rotating compressor valve for use in reciprocating compressors.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A reciprocating compressor is a positive-displacement device, which utilizes a motor to drive one or more pistons via a crank shaft and connecting rods. Each piston reciprocates back and forth in a compression cylinder to intake a process fluid (e.g., natural gas) into a chamber, compress the process fluid within the chamber, and exhaust the process fluid from the chamber to a desired output. In certain reciprocating compressors, poppet valves may be used to control the flow of the process fluid into and out of the chamber. However, poppet valves possess inherent operational inefficiencies.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a perspective view of an exemplary reciprocating compressor in accordance with an embodiment of the present invention;

FIG. 2 is a cross-sectional view of the exemplary reciprocating compressor of FIG. 1, illustrating internal components of the reciprocating compressor;

DETAILED DESCRIPTION OF SPECIFIC EMBODIMENTS

Figure 3:
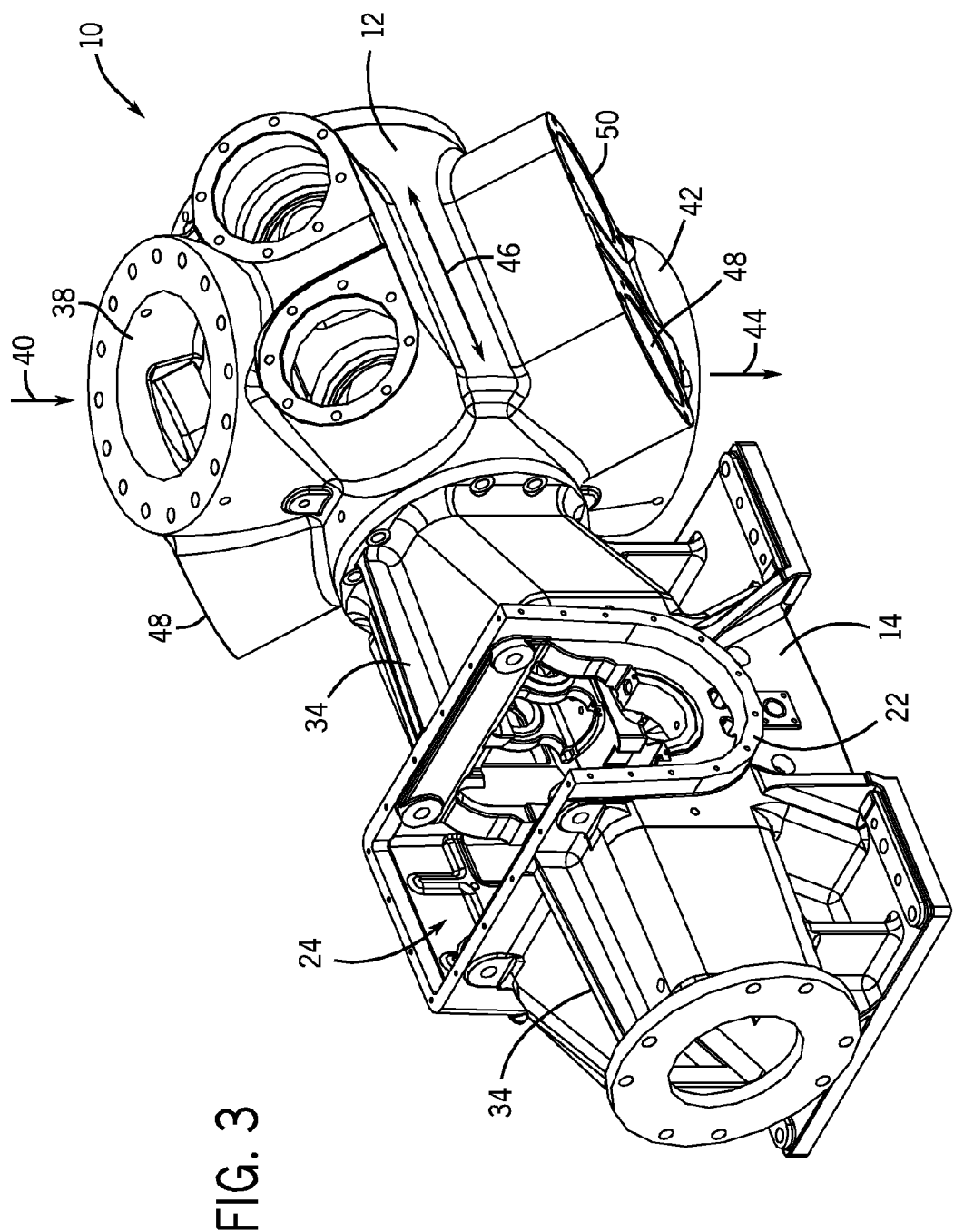
FIG. 3 is a partial perspective view of the exemplary reciprocating compressor of FIGS. 1 and 2.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," "said," and the like, are intended to mean that there are one or more of the elements. The terms "comprising," "including," "having," and the like are intended to be inclusive and mean that there may be additional elements other than the listed elements. Moreover, the use of "top," "bottom," "above," "below," and variations of these terms is made for convenience, but does not require any particular orientation of the components.

As described in detail below, the disclosed embodiments include a rotating compressor valve having stationary front and rear plates (e.g., guards) and a rotating plate configured to rotate relative to the stationary front and rear plates. The stationary front and rear plates and the rotating plate all include a plurality of slots which, when aligned, enable a process fluid (e.g., natural gas) to flow through the rotating compressor valve. In certain embodiments, the slots of the rotating plate include an arc radius (e.g., offset) that is smaller than a corresponding arc radius (e.g., offset) of the slots of the stationary front and rear plates. In addition, in certain embodiments, the slots of the stationary front and rear plates are chamfered to facilitate the flow of the process fluid through the rotating compressor valve. Furthermore, in certain embodiments, the slots of the rotating plate may include tapered edges to provide pinch points at the slot interfaces as the rotating plate rotates relative to the stationary front and rear plates. The rotating compressor valve also includes a plurality of brush seals, and a plurality of babbitt seals that ensure that the flow of the process fluid through the rotating compressor valve is sealed against leakage. The rotating compressor valve includes a motor for causing continuous rotation of the rotating plate relative to the stationary front and rear plates. In certain embodiments, the rotating compressor valve is associated with a controller configured to synchronize the continuous rotation of the rotating plate with compression cycles of a reciprocating compressor within which the rotating compressor valve operates.

Turning now to the figures, an exemplary reciprocating compressor 10 is illustrated in FIG. 1. In the presently illustrated embodiment, the reciprocating compressor 10 includes a pair of compression cylinders 12 coupled to a frame 14. A variety of internal components may be disposed within the compression cylinders 12 and the frame 14 to enable compression of fluids introduced into the reciprocating compressor 10 within the compression cylinders 12. For example, in certain embodiments, the reciprocating compressor 10 may be utilized to compress natural gas. However, in other embodiments, the reciprocating compressor 10 may be configured and/or utilized to compress other fluids.

A mechanical power source or driver 16, such as a combustion engine or an electric motor, may be coupled to the reciprocating compressor 10 to provide mechanical power to the various internal components to enable compression of the fluid within the compression cylinders 12. To facilitate access to such internal components, as may be desired for diagnostic or maintenance purposes, openings in the frame 14 may be provided and selectively accessed via removable covers 18. Further, the compression cylinders 12 may also include valve assemblies 20 for controlling flow of the fluid through the compression cylinders 12. More specifically, as described in greater detail below, the valve assemblies 20 may include the rotating compressor valves as described herein.

Although the exemplary reciprocating compressor 10 is illustrated as a two-stroke reciprocating compressor, other compressor configurations may also employ and benefit from the presently disclosed techniques. For instance, in other embodiments, the reciprocating compressor 10 may include a different number of cylinder strokes, such as a four-stroke compressor, a screw compressor, or the like. Further, other variations are also envisaged, including variations in the length of stroke, the operating speed, and the size, among other things.

FIG. 2 is a cross-sectional view of the exemplary reciprocating compressor 10 of FIG. 1, illustrating internal components of the reciprocating compressor 10. In the presently illustrated embodiment, the frame 14 of the exemplary reciprocating compressor 10 includes a hollow central body or housing 22 that generally defines an interior volume 24 within which various internal components may be housed, such as a crank shaft 26. In one embodiment, the central body 22 may have a generally curved or cylindrical shape. It should be noted, however, that the central body 22 may have other shapes or configurations in accordance with the disclosed embodiments.

In operation, the driver 16 rotates the crank shaft 26 supported within the interior volume 24 of the frame 14. In one embodiment, the crank shaft 26 is coupled to crossheads 30 via connecting rods 28 and pins 32. The crossheads 30 are disposed within crosshead guides 34, which generally extend from the central body 22 and facilitate connection of the compression cylinders 12 to the reciprocating compressor 10. In one embodiment, the reciprocating compressor 10 includes two crosshead guides 34 that extend generally perpendicularly from opposite sides of the central body or housing 22, although other configurations may be used. The rotational motion of the crank shaft 26 is translated via the connecting rods 28 to reciprocal linear motion of the crossheads 30 within the crosshead guides 34.

The compression cylinders 12 are configured to receive a fluid for compression. The crossheads 30 are coupled to pistons 36 disposed within the compression cylinders 12, and the reciprocating motion of the crossheads 30 enables compression of fluid within the compression cylinders 12 via the pistons 36. Particularly, as a piston 36 is driven forward (i.e., outwardly from central body 22) into a compression cylinder 12, the piston 36 forces the fluid within the cylinder into a smaller volume, thereby increasing the pressure of the fluid. A discharge valve of valve assembly 20 may then be opened to allow the pressurized or compressed fluid to exit the compression cylinder 12. The piston 36 may then stroke backward, and additional fluid may enter the compression cylinder 12 through an inlet valve of the valve assembly 20 for compression in the same manner described above. Again, as described in greater detail below, the valve assemblies 20 may include the rotating compressor valves as described herein.

FIG. 3 is a partial perspective view of the exemplary reciprocating compressor 10 of FIGS. 1 and 2. As illustrated, the reciprocating compressor 10 includes one of the compression cylinders 12 coupled to the frame 14. Various components and covers are removed from the reciprocating compressor 10 as illustrated in FIG. 3. However, the reciprocating compressor 10 includes a variety of similar components as discussed above with reference to FIGS. 1 and 2. For example, the frame 14 includes the central body 22 with the interior volume 24, which houses the crank shaft 26. In addition, the central body 22 is coupled to a pair of crosshead guides 34, which lead to respective compression cylinders 12.

In certain embodiments, a process fluid (e.g., natural gas) may be received into the compression cylinder 12 through the compression cylinder inlet 38, as illustrated by arrow 40, and discharged through the compression cylinder outlet 42, as illustrated by arrow 44. As the piston 36 moves back and forth within the interior of the compression cylinder 12, as illustrated by arrow 46, the process fluid will enter into first and second chambers within the compression cylinder 12, where it is compressed in an alternating manner, as described in greater detail below. In addition, a plurality of first-stage and second-stage valve assemblies, which reside in first-stage and second-stage valve housings 48, 50, respectively, may help control the flow of the process fluid through the first and second chambers within the compression cylinder 12.

Figure 4A:
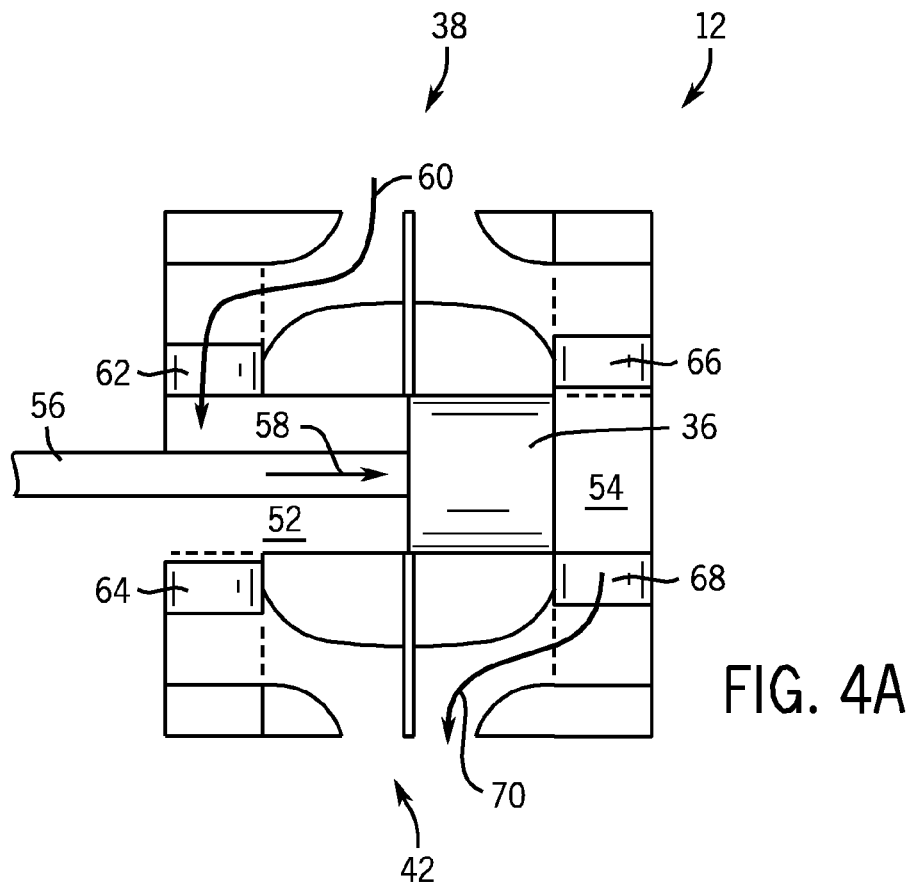
FIG. 4A is a cross-sectional side view of a compression cylinder of the exemplary reciprocating compressor of FIG. 3 when a piston within the compression cylinder is in a first stroke position.
Figure 4B:
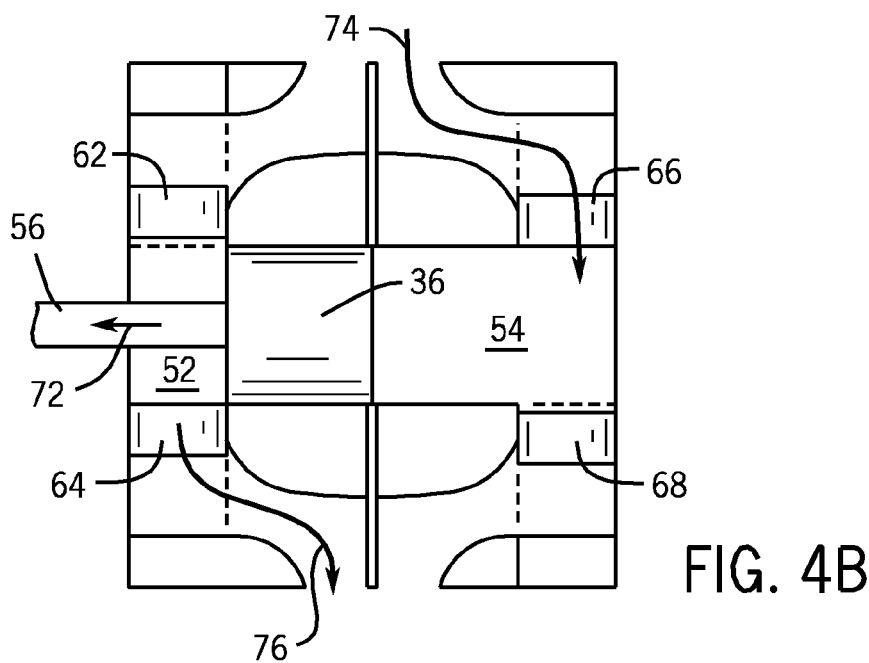
FIG. 4B is a cross-sectional side view of the compression cylinder of the exemplary reciprocating compressor of FIG. 3 when the piston within the compression cylinder is in a second stroke position.

For example, FIGS. 4A and 4B illustrate how the process fluid flows through first and second chambers 52, 54 of the compression cylinder 12 of the reciprocating compressor 10 of FIG. 3. In particular, FIG. 4A is a cross-sectional side view of the compression cylinder 12 when a shaft 56 connected to one of the crossheads 30 of FIG. 2 has caused the piston 36 to translate into a first stroke position, as illustrated by arrow 58. In this position, the process fluid may be drawn into the first chamber 52 through the compression cylinder inlet 38, as illustrated by arrow 60. In particular, a first inlet valve assembly 62 may be in an open position to enable the process fluid to enter the first chamber 52. However, a first outlet valve assembly 64 may be in a closed position to block the process fluid from exiting the first chamber 52 through the compression cylinder outlet 42.

Conversely, when the piston 36 is in the first stroke position illustrated in FIG. 4A, the process fluid is not being drawn into the second chamber 54 of the compression cylinder 12. Rather, a second inlet valve assembly 66 may be in a closed position to block the process fluid from entering the second chamber 54 through the compression cylinder inlet 38. However, a second outlet valve assembly 68 may be in an open position to enable the process fluid to exit the second chamber 54 through the compression cylinder outlet 42, as illustrated by arrow 70. In particular, when the piston 36 is in the first stroke position, the process fluid in the second chamber 54 has been compressed, while the process fluid in the first chamber 52 has not yet been compressed.

By way of comparison, FIG. 4B is a cross-sectional side view of the compression cylinder 12 when the shaft 56 has caused the piston 36 to translate into a second stroke position, as illustrated by arrow 72. In this position, the process fluid is drawn into the second chamber 54 through the compression cylinder inlet 38, as illustrated by arrow 74. In particular, the second inlet valve assembly 66 may be in an open position to enable the process fluid to enter the second chamber 54. However, the second outlet valve assembly 68 may be in a closed position to block the process fluid from exiting the second chamber 54 through the compression cylinder outlet 42.

Conversely, when the piston 36 is in the second stroke position illustrated in FIG. 4B, the process fluid is not being drawn into the first chamber 52 of the compression cylinder 12. Rather, the first inlet valve assembly 62 may be in a closed position to block the process fluid from entering the first chamber 52 through the compression cylinder inlet 38. However, the first outlet valve assembly 64 may be in an open position to enable the process fluid to exit the first chamber 52 through the compression cylinder outlet 42, as illustrated by arrow 76. In particular, when the piston 36 is in the second stroke position, the process fluid in the first chamber 52 has been compressed, while the process fluid in the second chamber 54 has not yet been compressed.

Therefore, as the piston 36 translates between the first and second stroke positions illustrated in FIGS. 4A and 4B, the process fluid will be compressed in the first and second chambers 52, 54 within the compression cylinder 12 in an alternating manner. More specifically, the first and second inlet valve assemblies 62, 66 and the first and second outlet valve assemblies 64, 68 may help control the flow of the process fluid through the first and second chambers 52, 54, while the process fluid is being compressed in an alternating manner. In particular, the first and second inlet valve assemblies 62, 66 and the first and second outlet valve assemblies 64, 68 may all contain rotating compressor valves, which may control the flow of the process fluid through the first and second chambers 52, 54.

The disclosed rotating compressor valves are used instead of other less efficient valves, such as poppet valves, to improve operation of the valve assemblies 62, 64, 66, 68. As appreciated, poppet valves have certain drawbacks, as discussed below after a brief discussion of the operation of poppet valves. When poppet valves are in the suction position, back pressure tries to force poppets of the poppet valve open while pressure in the adjacent chamber 52, 54 plus the force of springs in the poppet valve maintain the seal (i.e., maintain the poppet valve in a closed position). At some point during the expansion stroke of the piston 36, the pressure in the chamber 52, 54 becomes less than the back pressure against the poppets of the poppet valve. As a result, the seal breaks and the spring-loaded poppets displace into the poppet valve, allowing fluid to flow through the poppet valve and into the chamber 52, 54 for the compression stroke that follows. As the chamber 52, 54 fills with the fluid, the pressure inside the chamber 52, 54 increases, causing the poppet valve to return to the closed position just as the compression stroke begins. Conversely, poppet valves that are in the discharge position operate similarly to poppet valves that are in the suction position, but have an opposing orientation. As a result, discharge poppet valves actuate when the pressure in the adjacent chamber 52, 54 exceeds the discharge back pressure and spring forces. As the compression stroke completes, the volume of the fluid remaining in the chamber 52, 54 is insufficient to overcome the back pressure and spring forces, and the poppet valve closes.

At high compressor speed duties (e.g., greater than approximately 1,100 reciprocations per minute (rpm)), these poppet valves may experience spring fatigue and ineffective valve response times. In addition, for a given cycle speed, only half of the poppets on the poppet valves may actuate due to a turbulent pressure distribution on the chamber-side face of the poppet valves. Non-uniform actuation of the poppets restricts the flow, resulting in pressure losses through the poppet valves. Pressure losses in the poppet valves waste energy input into the reciprocating compressor 10. In addition, non-uniform actuation of the poppets cause the poppet valves to not keep up with the higher compression speeds, whereby the poppets may flutter partially open, compromising the seals of the poppet valves. For example, when a seal in a discharge poppet valve is compromised, additional volume must be compressed in the adjacent chamber 52, 54, lowering the efficiency of the reciprocating compressor 10. As a result, these poppet valves may contribute to a drop in overall compressor efficiency of approximately 8-10%.

Figure 5:
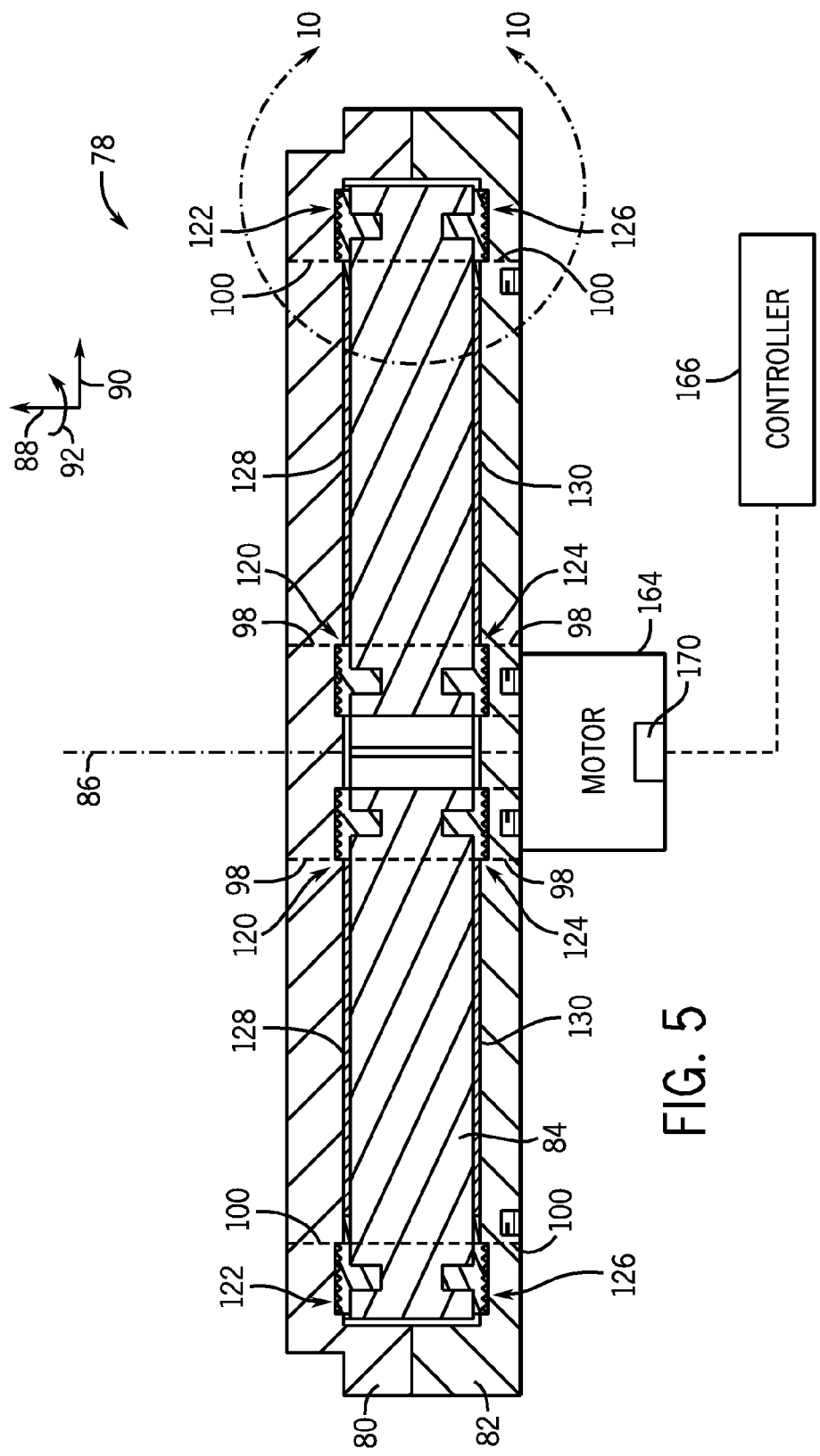
FIG. 5 is a cutaway side view of an exemplary embodiment of a rotating compressor valve for use in valve assemblies of the compression cylinder of the reciprocating compressor of FIGS. 4A and 4B.

As described herein, the first and second inlet valve assemblies 62, 66 and the first and second outlet valve assemblies 64, 68 may all contain rotating compressor valves, which may control the flow of the process fluid through the first and second chambers 52, 54. These rotating compressor valves address many of the shortcomings of poppet valves. FIG. 5 is a cutaway side view of an exemplary embodiment of a rotating compressor valve 78 for use in the first and second inlet valve assemblies 62, 66 and the first and second outlet valve assemblies 64, 68 of the compression cylinder 12 of the reciprocating compressor 10 of FIGS. 4A and 4B. As illustrated, the rotating compressor valve 78 includes three plates 80, 82, 84. In particular, the rotating compressor valve 78 includes a stationary front plate 80, a stationary rear plate 82, and a rotating plate 84 axially disposed between the stationary front and rear plates 80, 82.

The stationary front and rear plates 80, 82 serve the dual purpose of providing structural integrity against the high pressure fluid (e.g., natural gas) as well as providing static mating plates complimented by the rotating plate 84 for sealing. In certain embodiments, the stationary front and rear plates 80, 82 may be constructed of appropriate carbon steel. To minimize the rotational inertia of the rotating plate 84, in certain embodiments, the rotating plate 84 may be made of a high-temperature thermoplastic or high-strength aluminum. These materials are relatively strong with respect to their densities. The stationary rear plate 82 has a cross-sectional geometry arrangement substantially similar to the stationary front plate 80.

The rotating plate 84 is configured to rotate about a common central axis 86, which is oriented in an axial direction 88 through the rotating compressor valve 78. For illustration purposes described herein, the axial direction 88 extends along the central axis 86 of the rotating compressor valve 78, a radial direction 90 extends orthogonally out from the central axis 86 of the rotating compressor valve 78, and a circumferentially direction 92 relates to a rotational direction about the central axis 86 of the rotating compressor valve 78.

Figure 6A:
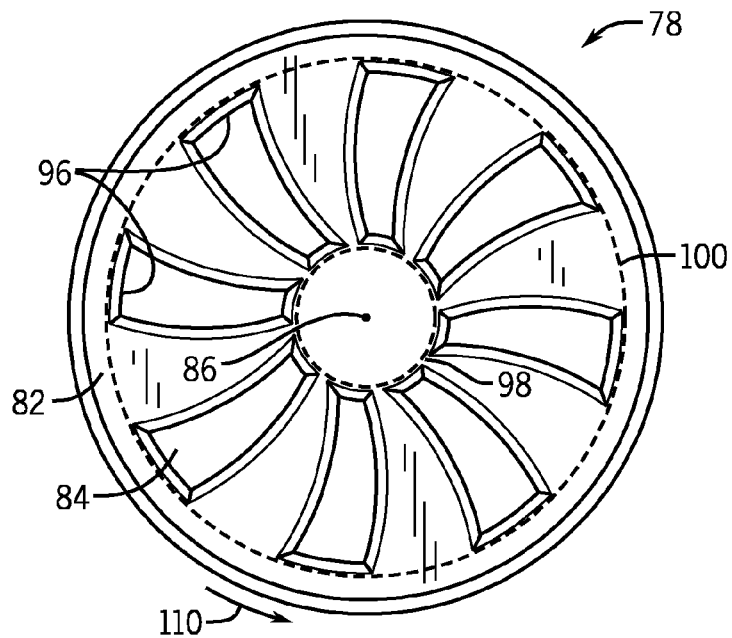
FIG. 6A is a bottom view of an exemplary embodiment of the rotating compressor valve when slots in the rotating plate do not align with complimentary slots in the stationary front and rear plates.
Figure 6B:
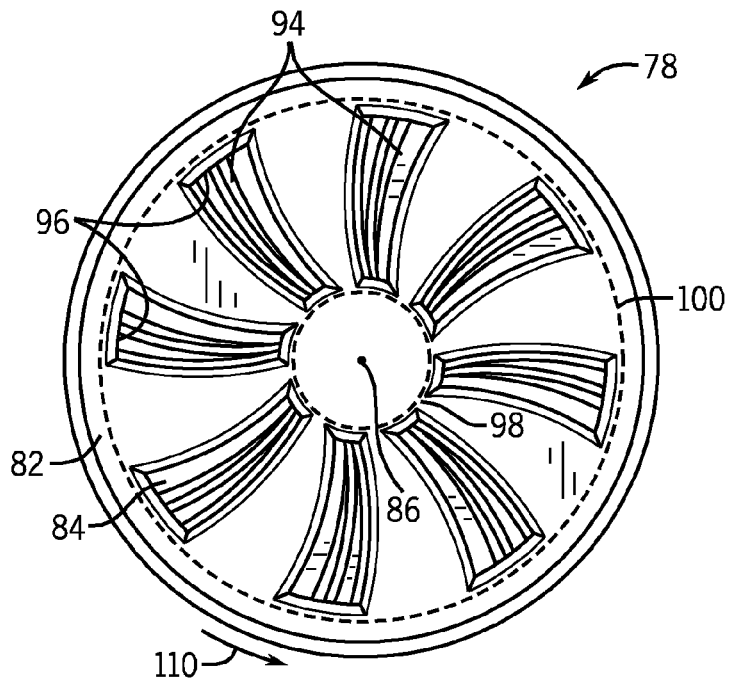
FIG. 6B is a bottom view of an exemplary embodiment of the rotating compressor valve when the slots in the rotating plate align with the complimentary slots in the stationary front and rear plates.

As the rotating plate 84 rotates about the central axis 86 relative to the stationary front and rear plates 80, 82, slots in the rotating plate 84 align with complimentary slots in the stationary front and rear plates 80, 82 such that fluid is allowed to flow through the rotating compressor valve 78. FIG. 6A is a bottom view of an exemplary embodiment of the rotating compressor valve 78 when slots 94 (see FIG. 6B) in the rotating plate 84 do not align with complimentary slots 96 in the stationary front and rear plates 80, 82, and FIG. 6B is a bottom view of an exemplary embodiment of the rotating compressor valve 78 when the slots 94 in the rotating plate 84 align with the complimentary slots 96 in the stationary front and rear plates 80, 82. In other words, FIG. 6A depicts the rotating compressor valve 78 in a fully closed position where no fluid is allowed to flow through the rotating compressor valve 78, and FIG. 6B depicts the rotating compressor valve 78 in a fully open position where the maximum flow rate of the fluid through the rotating compressor valve 78 may be achieved.

As illustrated in FIGS. 6A and 6B, in certain embodiments, the stationary front and rear plates 80, 82 may include eight slots 96 equally spaced circumferentially 92 around the stationary front and rear plates 80, 82, and the rotating plate 84 may include eight complimentary slots 94 equally spaced circumferentially 92 around the rotating plate 84. However, in other embodiments, the stationary front and rear plates 80, 82 and the rotating plate 84 may include 2, 3, 4, 5, 6, 7, 8, 9, 10, 11, 12, or more (e.g., 1 to 100) slots 96, 94.

As described in greater detail below, a motor (e.g., a direct current (DC) motor) may be used to cause the rotating plate 84 to rotate relative to the stationary front and rear plates 80, 82. Various actuation schemes may be used to cause various rotation cycles for the rotating plate 84 relative to the stationary front and rear plates 80, 82. For example, in certain embodiments, the motor may cause the rotating plate 84 to rotate intermittently in one direction by a predetermined angular distance, remain at that location for a set period of time, and then again rotate by the predetermined angular distance in the same direction. In other embodiments, the motor may cause the rotating plate 84 to rotate intermittently in one direction by a predetermined angular distance, remain at that location for a set period of time, and then rotate by the predetermined angular distance in the opposite direction.

However, the accelerations experienced by the rotating plate 84 using these intermittent actuation schemes may be extremely high, leading to extremely high stress values (e.g., as great as approximately 7,000 pounds per square inch (psi) at compressor speeds in a range of approximately 1,200-1,800 rpm). As such, as described in greater detail below, the rotating compressor valve 78 may be associated with a motor configured to cause the rotating plate 84 to rotate continuously relative to the stationary front and rear plates 80, 82 with little to no axial translation of the rotating plate 84 relative to the stationary front and rear plates 80, 82. Therefore, as described in greater detail below, the motor may be controlled to cause the slots 94 of the rotating plate 84 and the slots 96 of the stationary front and rear plates 80, 82 to be aligned at appropriate timing to coincide with the compression or expansion strokes (i.e., depending on whether the rotating compressor valve 78 is a suction or discharge valve, and which chamber 52, 54 the rotating compressor valve 78 is adjacent to) of the reciprocating compressor 10. The interaction between the slots 94 of the rotating plate 84 and the slots 96 of the stationary front and rear plates 80, 82 is based on a synchronization scheme that enables the reciprocating compressor 10 to run at full efficiency without having to rely on pressure differentials to actuate the rotating compressor valve 78 (e.g., as with poppet valves).

As illustrated in FIGS. 6A and 6B, the slots 96 of the stationary front and rear plates 80, 82 and the slots 94 of the rotating plate 84 are curved from an inner slot radius 98 to an outer slot radius 100. As described herein, the inner slot radius 98 and the outer slot radius 100 are imaginary circles extending around the central axis 86 that generally correspond to the inner and outer radii of the slots 94, 96 of the plates 80, 82, 84 in the rotating compressor valve 78. However, as described in greater detail below, the inner and outer slot radius 98, 100 also correspond to other features of the rotating compressor valve 78 (e.g., locations and orientations of seals of the rotating compressor valve 78, a motor of the rotating compressor valve 78, and so forth).

Figure 7:
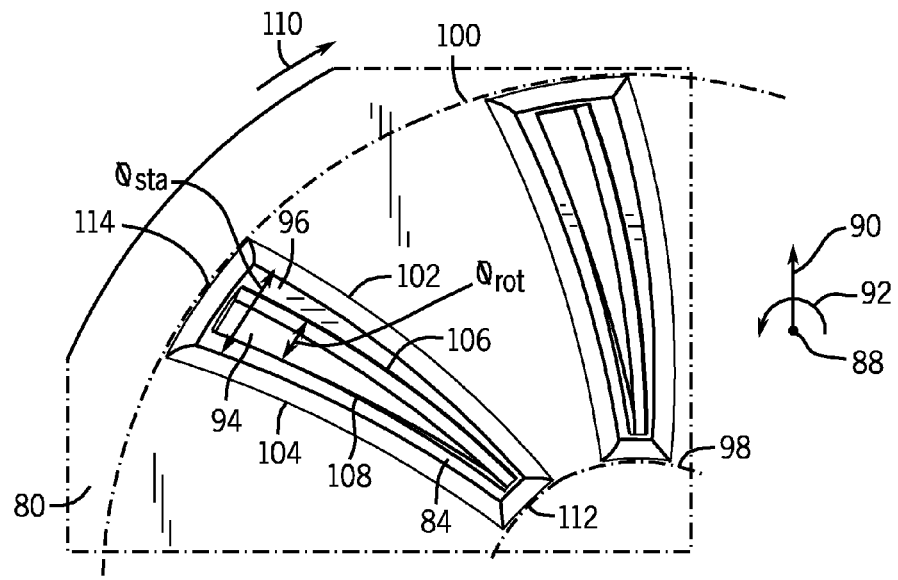
FIG. 7 is a partial top view of an exemplary embodiment of the rotating compressor valve when the slots in the rotating plate align with the complimentary slots in the stationary front and rear plates.

FIG. 7 is a partial top view of an exemplary embodiment of the rotating compressor valve 78 when the slots 94 in the rotating plate 84 align with the complimentary slots 96 in the stationary front and rear plates 80, 82. As illustrated in FIG. 7, the slots 96 of the stationary front and rear plates 80, 82 include a first edge 102 that curves or extends radially from the inner slot radius 98 to the outer slot radius 100 in a convex fashion, and a second edge 104 that curves or extends radially from the inner slot radius 98 to the outer slot radius 100 in a concave fashion. Similarly, the slots 94 of the rotating plate 84 include a first edge 106 that curves or extends radially from the inner slot radius 98 to the outer slot radius 100 in a convex fashion, and a second edge 108 that curves or extends radially from the inner slot radius 98 to the outer slot radius 100 in a concave fashion.

The curved geometries of the slots 94, 96 facilitate the flow of natural gas through the rotating compressor valve 78. It should be noted that the embodiment illustrated in FIGS. 6A, 6B, and 7 illustrates the slots 96 of the stationary rear plate 82 and the slots 94 of the rotating plate 84 as curved in a particular angular direction. These particular slot geometries are appropriate for an embodiment where the rotating plate 84 rotates about the central axis 86 with respect to the stationary front and rear plates 82, 84 in a counterclockwise direction when viewed from the bottom of the rotating compressor valve 78 (and in a clockwise direction when viewed from the top of the rotating compressor valve 78), as illustrated by arrow 110. Those skilled in the art will appreciate that in embodiments where the rotating plate 84 rotates about the central axis 86 with respect to the stationary front and rear plates 82, 84 in an opposite angular direction, the slot geometries may be reversed from the embodiment of FIGS. 6A, 6B, and 7.

In addition, as illustrated in FIG. 7, the slots 94 of the rotating plate 84 extend circumferentially 92 a shorter arc distance than the slots 96 of the stationary front and rear plates 80, 82. In other words, the first edges 106 of the slots 94 of the rotating plate 84 are circumferentially 92 separated from the second edges 108 of the rotating plate 84 by an arc distance $\theta_{rot}$ that is substantially smaller than an arc distance $\theta_{sta}$ that the first edges 102 of the slots 96 of the stationary front and rear plates 80, 82 are circumferentially 92 separated from the second edges 104 of the slots 96 of the stationary front and rear plates 80, 82. For example, in certain embodiments, the arc distance $\theta_{rot}$ of the slots 94 of the rotating plate 84 may be approximately 5.875 degrees, whereas the arc distance $\theta_{sta}$ of the slots 96 of the stationary front and rear plates 80, 82 may be approximately 11 degrees.

In other embodiments, the arc distance $\theta_{rot}$ of the slots 94 of the rotating plate 84 may be approximately 4, 4.5, 5, 6, 6.5, 7, 7.5, or 8 degrees, or even more, whereas the arc distance $\theta_{sta}$ of the slots 96 of the stationary front and rear plates 80, 82 may be approximately 8, 8.5, 9, 9.5, 10, 10.5, 11, 11.5, 12, 12.5, 13, 13.5, or 14 degrees, or even more. In other words, the arc distance $\theta_{rot}$ of the slots 94 of the rotating plate 84 may be within a range of approximately 4 degrees to approximately 8 degrees, or even more, whereas the arc distance $\theta_{sta}$ of the slots 96 of the stationary front and rear plates 80, 82 may be within a range of approximately 8-14 degrees. In general, the arc distance $\theta_{sta}$ of the slots 96 of the stationary front and rear plates 80, 82 may be greater than the arc distance $\theta_{rot}$ of the slots 94 of the rotating plate 84 by approximately 3, 3.5, 4, 4.5, 5, 5.5, 6, 6.5, or 7 degrees, or even more. In other words, the arc distance $\theta_{sta}$ of the slots 96 of the stationary front and rear plates 80, 82 may be greater than the arc distance $\theta_{rot}$ of the slots 94 of the rotating plate 84 by a range of approximately 3-7 degrees. The specific dimensions of the arc distance $\theta_{rot}$ of the slots 94 of the rotating plate 84 and the arc distance $\theta_{sta}$ of the slots 96 of the stationary front and rear plates 80, 82 are generally selected based on the speed of the reciprocating compressor 10, the flow rate of the fluid through the reciprocating compressor 10 (and, more specifically, the rotating compressor valves 78), and so forth.

As also illustrated in FIG. 7, in certain embodiments, all four edges of the slots 96 of the stationary front and rear plates 80, 82 may be chamfered. More specifically, the first and second edges 102, 104 of the slots 96 may be chamfered such that the faces of the first and second edges 102, 104 open away from the slots 94 of the rotating plate 84. Similarly, radially inner and outer edges 112, 114 of the slots 96 may be chamfered such that the faces of the radially inner and outer edges 112, 114 open away from the slots 94 of the rotating plate 84. The chamfered nature of the edges 102, 104, 112, 114 of the slots 96 of the stationary front and rear plates 80, 82 facilitate the flow of the fluid (and, more specifically, do not inhibit the flow of the fluid) into and out of the rotating compressor valve 78. Both of the stationary front and rear plates 80, 82 include substantially similar slots 96. In other words, while FIG. 7 illustrates the slots 96 of the stationary front plate 80, the stationary rear plate 82 includes substantially similar slots 96, with the only difference being the orientation of the curved geometries such that the slots 96 of the stationary rear plate 82 are configured to align with the slots 94 of the rotating plate 84 and the slots 96 of the stationary front plate 80.

Figure 8:
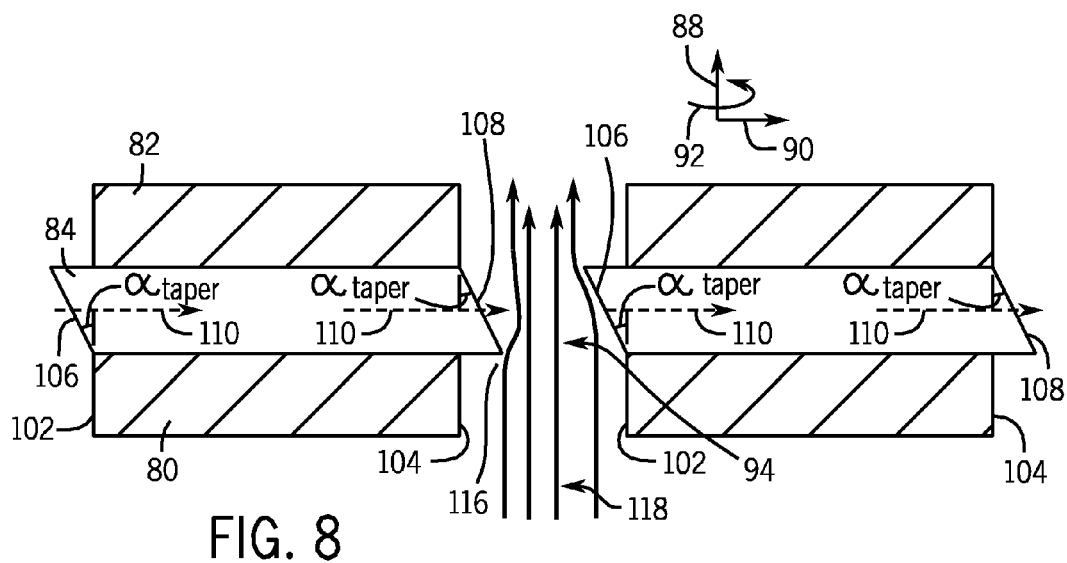
FIG. 8 is a partial cross-sectional side view of an exemplary embodiment of the rotating compressor valve.

In certain embodiments, the slots 94 of the rotating plate 84 may include tapered first and second edges 106, 108. FIG. 8 is a partial cross-sectional side view of an exemplary embodiment of the rotating compressor valve 78. As illustrated in FIG. 8, the slots 94 of the rotating plate 84 include tapered first and second edges 106, 108, such that the second edges 108 provide pinch points 116 against the fluid (e.g., natural gas) flow 118 flowing through the slots 94 as the rotating plate 84 rotates in a direction illustrated by arrows 118. For example, in certain embodiments, the first and second edges 106, 108 may include a constant tapered angle $\alpha_{taper}$ of approximately 15 degrees from the stationary front plate 80 to the stationary rear plate 82. In other embodiments, the tapered angle $\alpha_{taper}$ may be approximately 5, 10, 15, 20, 25, 30, 35, 40, or 45 degrees, or even more. The tapered angle $\alpha_{taper}$ may be oriented such that the first edges 106 of the slots 94 are angled toward the stationary front plate 80, and the second edges 108 of the slots 94 are angled toward the stationary rear plate 82.

The tapered nature of the first and second edges 106, 108 of the slots 94 of the rotating plate 84 limit shearing of the fluid flow 118 in an axial direction 88 along the central axis 86 of the rotating compressor valve 78. The tapered first edges 106 of the slots 94 facilitate flow orthogonal to the central axis 86 of the rotating compressor valve 78 to limit the amount of the fluid flow 118 that is carried with the rotating plate 84 at the instant in time before the seal between the rotating plate 84 and the stationary front and rear plates 80, 82 is established. Conversely, the tapered second edges 108 of the slots 94 create the pinch points 116, slightly forcing the fluid flow 118 in the direction of rotation 110 of the slots 94.

As such, the rotating compressor valve 78 introduces the fluid flow 118 into every cubic inch of flow volume. As described in greater detail below, the actuation of the rotating compressor valve 78 depends on synchronized, constant rotation of the rotating plate 84 relative to the stationary front and rear plates 80, 82 based on the displacement cycles of the pistons 36 of the reciprocating compressor 10. Assuming that the rotation of the rotating plate 84 with respect to the stationary front and rear plates 80, 82 is appropriately synchronized with the displacement cycles of the pistons 36 of the reciprocating compressor 10, the rotating compressor valve 78 results in reductions in aerodynamic losses in comparison to poppet valves, with uniform actuation and fluid flow 118 through the rotating compressor valve 78.

In addition, as opposed to poppet valves, there is very little axial translation of the individual components of the rotating compressor valve 78. As such, the methods for sealing between the rotating plate 84 and the stationary front and rear plates 80, 82 are substantially different than that of poppet valves. More specifically, the sealing techniques of the rotating compressor valve 78 enable the rotating plate 84 to continuously rotate between the stationary front and rear plates 80, 82, while maintaining an effective seal. In particular, the rotating compressor valve 78 seals against leakage at each slot interface (i.e., around each slot 96 of the stationary front and rear plates 80, 82), as well as at the inner and outer diameters of the rotating plate 84 (i.e., near the inner and outer slot radii 98, 100).

Returning now to FIG. 5, the rotating compressor valve 78 includes several seals that maintain the sealing of the rotating compressor valve 78 at the slot interfaces and at the inner and outer diameters of the rotating plate 84. For example, the rotating plate 84 includes a front inner babbit seal 120, a front outer babbit seal 122, a rear inner babbit seal 124, and a rear outer babbit seal 126. As described in greater detail below, the babbit seals 120, 122, 124, 126 ensure sealing at the inner and outer diameters of the rotating plate 84 (i.e., near the inner and outer slot radii 98, 100). In addition, the rotating compressor valve 78 includes a plurality of front brush seals 128 disposed axially between the stationary front plate 80 and the rotating plate 84, and a plurality of rear brush seals 130 disposed axially between the stationary rear plate 82 and the rotating plate 84. As also described in greater detail below, the brush seals 128, 130 ensure sealing at the slot interfaces.

The front inner and outer babbitt seals 120, 122 are both disposed axially between the stationary front plate 80 and the rotating plate 84. As described in greater detail below, the front inner babbitt seal 120 includes a generally annular seal body attached to the rotating plate 84 just radially inside of, and in some embodiments adjacent to, the inner slot radius 98 of the rotating compressor valve 78 on a side of the rotating plate 84 facing the stationary front plate 80. In addition, the front outer babbitt seal 122 includes a generally annular seal body attached to the rotating plate 84 just radially outside of, and in some embodiments adjacent to, the outer slot radius 100 of the rotating compressor valve 78 on a side of the rotating plate 84 facing the stationary front plate 80.

Similarly, the rear inner and outer babbitt seals 124, 126 are both disposed axially between the stationary rear plate 82 and the rotating plate 84. As described in greater detail below, the rear inner babbitt seal 124 includes a generally annular seal body attached to the rotating plate 84 just radially inside of, and in some embodiments adjacent to, the inner slot radius 98 of the rotating compressor valve 78 on a side of the rotating plate 84 facing the stationary rear plate 82. In addition, the rear outer babbitt seal 126 includes a generally annular seal body attached to the rotating plate 84 just radially outside of, and in some embodiments adjacent to, the outer slot radius 100 of the rotating compressor valve 78 on a side of the rotating plate 84 facing the stationary rear plate 82.

Figure 9:
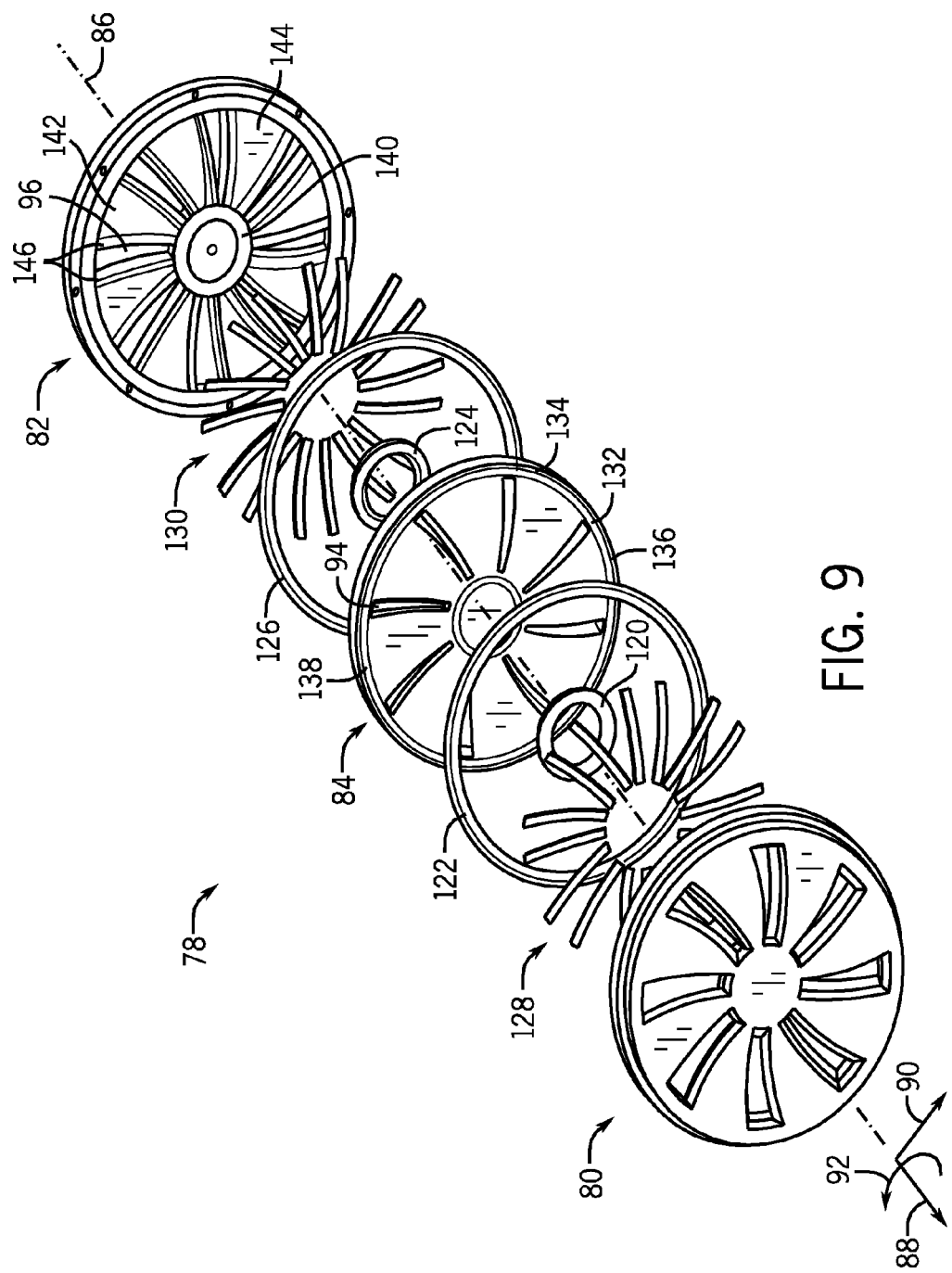
FIG. 9 is an exploded perspective view of an exemplary embodiment of the rotating compressor valve.

FIG. 9 is an exploded perspective view of an exemplary embodiment of the rotating compressor valve 78. As such, FIG. 9 illustrates how the various components of the rotating compressor valve 78 align with each other along the central axis 86 of the rotating compressor valve 78. One manufacturing constraint is the operating temperatures that are experienced by the rotating compressor valve 78, which may be in a range of approximately 32° F. to approximately 400° F. This operating temperature range mainly affects the sealing (i.e., of the babbitt seals 120, 122, 124, 126 and the brush seals 128, 130) and the rotating plate 84. The rotating plate 84 may be constructed as a high strength, lightweight plate.

Therefore, it may be advantageous to construct the rotating plate 84 out of a high-temperature thermoplastic material. Most thermoplastic materials begin melting around approximately 250° F., but there are several other materials that can withstand higher operating temperatures (e.g., greater than approximately 400° F.). These materials include polyetheretherketone (PEEK) with 30% carbon fiber, polyaryletherketone (PAEK) with 30% carbon fiber, polychlorinated terphenyl (PCT) with 30% glass fiber, polyimide (PI) with 30% carbon fiber, polyphenylene sulfide (PPS) with 30% carbon fiber, fluoroelastomers such as Viton, polytetrafluoroethylene (PTFE), and so forth. Any of these materials may be used for construction of the rotating plate 84.

In certain embodiments, the rotating plate 84 may be manufactured using an injection molding process. Using an injection molding process may enable the babbitt seals 120, 122, 124, 126 to be directly molded into the rotating plate 84 because inserts may be included in the mold. More specifically, certain injection molding processes enable small enough tolerances that teeth of the babbitt seals 120, 122, 124, 126 may be created using the injection molding processes.

The stationary front and rear plates 80, 82 have substantially axi-symmetrical designs. In other words, the designs of the stationary front and rear plates 80, 82 are almost identical. As described above, each of the stationary front and rear plates 80, 82 include slots 96 that are chamfered to facilitate flow through the rotating compressor valve 78. The stationary front and rear plates 80, 82 provide the main structural integrity of the rotating compressor valve 78 and, as such, may be constructed of steel in certain embodiments. For example, Austenic cast iron is relatively inexpensive, and may be manufactured using investment casting, which allows intricate details in the cast plates (e.g., the 0.125 inch by 0.125 inch grooves 146 within which the brush seals 128, 130 may be inserted).

As illustrated in FIG. 9, the rotating plate 84 includes an inner annular groove 132 and an outer annular groove 134, both of which extend circumferentially around the rotating plate 84. Although illustrated in FIG. 9 as being located on a front side 136 (i.e., the side of the rotating plate 84 facing the stationary front plate 80) of the rotating plate 84, an opposite rear side 138 of the rotating plate 84 includes substantially identical inner and outer annular grooves 132, 134. As described in greater detail below, the inner and outer annular grooves 132, 134 are used to attach the babbitt seals 120, 122, 124, 126 to the rotating plate 84. For example, the front inner babbitt seal 120 is configured to attach to the rotating plate 84 by, for example, interference fitting a portion of the front inner babbitt seal 120 into the inner annular groove 132 on the front side 136 of the rotating plate 84. Similarly, the front outer babbitt seal 122 is configured to attach to the rotating plate 84 by, for example, interference fitting a portion of the front outer babbitt seal 122 into the outer annular groove 134 on the front side 136 of the rotating plate 84. The rear inner and outer babbitt seals 124, 126 are configured to attach to the inner and outer annular grooves 132, 134 on the rear side 138 of the rotating plate 84 in a similar manner.

As also described in greater detail below, both the stationary front and rear plates 80, 82 include an inner babbitt material ring 140 and an outer babbitt material ring 142. More specifically, the inner babbitt material ring 140 includes a layer of babbitt material that has been, for example, sprayed onto an axially inner side 144 (i.e., a side facing axially inward toward the rotating plate 84) of both of the stationary front and rear plates 80, 82 in a ring-like pattern as illustrated in FIG. 9. Similarly, the outer babbitt material ring 142 includes a layer of babbitt material that has been, for example, sprayed onto the axially inner side of both of the stationary front and rear plates 80, 82 in a ring-like pattern as illustrated in FIG. 9.

As also illustrated in FIG. 9, the stationary front and rear plates 80, 82 both include a plurality of grooves 146 in the axially inner side 144, with each groove 144 corresponding to one of the brush seals 128, 130. For example, as illustrated, each of the grooves 146 in the axially inner side 144 of the stationary rear plate 82 corresponds to one of the rear brush seals 130 and, more specifically, each of the rear brush seals 130 are configured to fit within a respective groove 146 in the axially inner side 144 of the stationary rear plate 82. Similarly, each of the grooves 146 in the axially inner side 144 of the stationary front plate 80 correspond to one of the front brush seals 128 and, more specifically, each of the front brush seals 128 are configured to fit within a respective groove 146 in the axially inner side 144 of the stationary front plate 80.

As illustrated in FIG. 9, each slot 96 of the stationary front and rear plates 80, 82 is associated with two grooves 146. For example, as illustrated, each slot 96 of the stationary rear plate 82 is associated with a groove 146 on both circumferential 92 sides of the slot 96 within which a respective rear brush seal 130 may fit. Similarly, each slot 96 of the stationary front plate 80 is associated with a groove 146 on both circumferential sides of the slot 96 within which a respective front brush seal 128 may fit. In certain embodiments, although the grooves 146 are not directly adjacent to the slots 96, the grooves 146 extend radially outward from the inner slot radius 98 to the outer slot radius 100 generally following the convex or concave shape of the adjacent edge 102, 104 of the slot 96. For example, in certain embodiments, every point along each of the grooves 146 may be circumferentially separated from the adjacent edge 102, 104 of its respective slot 96 by a substantially fixed distance.

Figure 10:
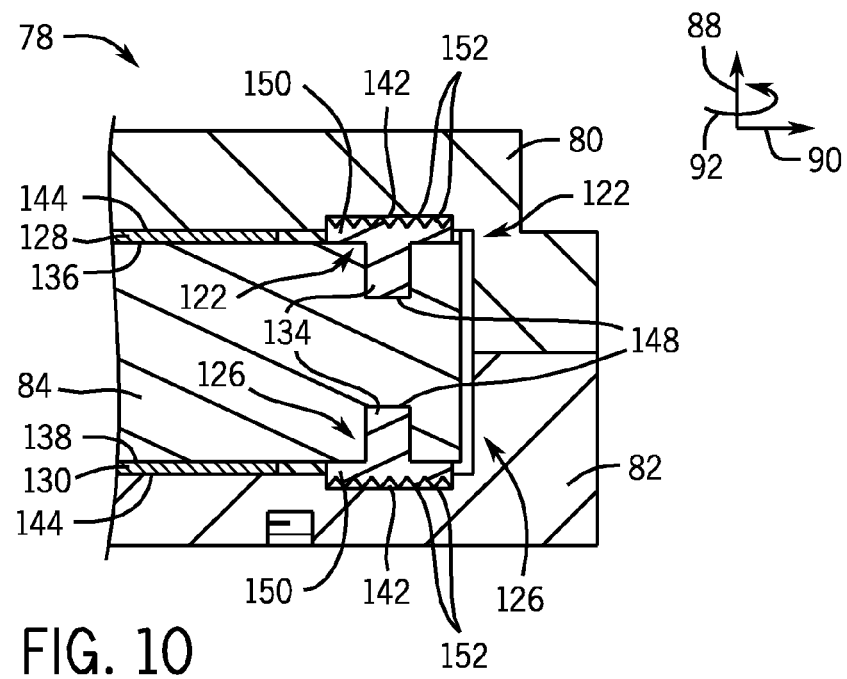
FIG. 10 is a partial cutaway side view of an exemplary embodiment of the rotating compressor valve taken within line 10-10 of FIG. 5.

FIG. 10 is a partial cutaway side view of an exemplary embodiment of the rotating compressor valve 78 taken within line 10-10 of FIG. 5. More specifically, cross-sectional profiles of the front outer babbitt seal 122 and the rear outer babbitt seal 126 are illustrated. As described above, part of both the front outer babbitt seal 122 and the rear outer babbitt seal 126 includes an outer babbitt material ring 142 that may, for example, be sprayed onto the axially inner side 144 of both of the stationary front and rear plates 80, 82. In addition, both the front and rear outer babbitt seals 122, 126 include a main body section 148, which may fit within the outer annular grooves 134 of the front and rear sides 136, 138 of the rotating plate 84, respectively. Furthermore, both the front and rear babbitt seals 122, 126 also include a generally flat section 150, which contains a plurality of babbitt teeth 152 that interface with the outer babbitt material ring 142 of the stationary front and rear plates 80, 82, respectively. Although not illustrated in FIG. 10, the front and rear inner babbitt seals 120, 124 include similar main body sections that fit within the inner annular grooves 132 of the front and rear sides 136, 138 of the rotating plate 84, and similar generally flat sections that contain a plurality of babbitt teeth that interface with the inner babbitt material ring 140 of the stationary front and rear plates 80, 82, respectively.

As the rotating plate 84 rotates with respect to the stationary front and rear plates 80, 82, the plurality of babbitt teeth 152 of the front and rear outer babbitt seals 122, 126 cut grooves into the outer babbitt material rings 142 of the stationary front and rear plates 80, 82, respectively, creating a non-contact mechanical seal useable at any speed. In order for leakage to occur, flow must progress through very small passages created by the small clearance (e.g., approximately 0.03-0.05 inches) between the abrasive babbitt teeth 152 and the babbitt material of the outer babbitt material rings 142. The clearance that is created ensures that any gas in this passage experiences vortices due to throttling and, as a result, leakage is very minimal. This enables effective radial sealing at constant angular velocity.

As such, the babbitt teeth 152 are an integral part of the rotating compressor valve 78 inasmuch as they provide the radial seal within the rotating compressor valve 78. In certain embodiments, the babbitt teeth 152 may have a minimum hardness of 40 Rockwell C, or 400 on the Vickers scale. In certain embodiments, the babbitt seals 120, 122, 124, 126 may be made from 4140 steel tempered at 205° C. and oil quenched. This steel satisfies the hardness requirements and is relatively inexpensive. Additionally, this steel is approved for use in the types of hazardous environments in which the rotating compressor valve 78 may operate. Since the babbitt teeth 152 extend from mainly flat, circular disks, they may be formed with a simple, one-step shaping process to prevent breaking. In certain embodiments, hot closed die forging or stamping may be employed to manufacture the babbitt teeth 152.

Figure 11:
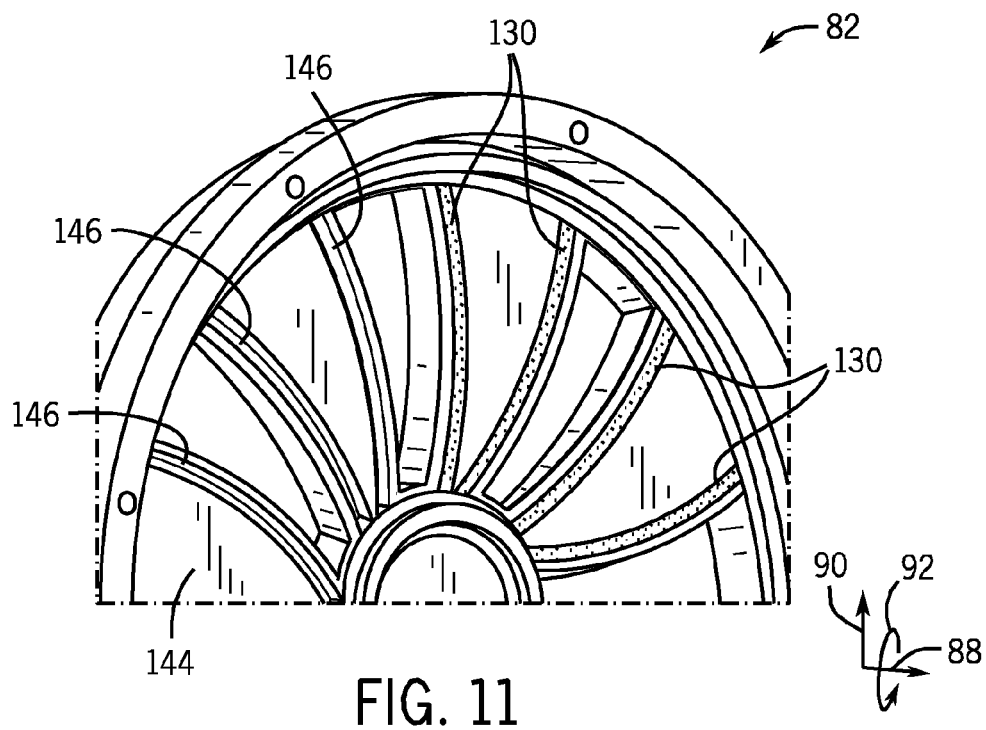
FIG. 11 is a perspective view of an exemplary embodiment of the stationary rear plate.

FIG. 11 is a perspective view of an exemplary embodiment of the stationary rear plate 82. As described above, the stationary front and rear plates 80, 82 both include a plurality of grooves 146. For example, as illustrated in FIG. 11, each slot 96 of the stationary rear plate 82 is associated with a groove 146 on both circumferential 92 sides of the slot 96 within which a respective rear brush seal 130 may fit. FIG. 11 also illustrates some of the rear brush seals 130 when they are inserted into the grooves 146. The front and rear brush seals 128, 130 are used to minimize the amount of leakage at the slot interfaces (i.e., around each slot 96 of the stationary front and rear plates 80, 82, respectively). In certain embodiments, the brush seals 128, 130 may be squeeze inserted into the grooves 146 aided by silicon grease, where they may become attached into the grooves 146 by straining the grooves 146. In certain embodiments, the grooves 146 may include a 0.125 inch by 0.125 inch rectangular cross-sectional profile, into which a body section of the brush seals 128, 130 may be squeeze inserted.

The front and rear brush seals 128, 130 also include brush material that extends axially 88 from the body section of the front and rear brush seals 128, 130 and that contacts the front and rear sides 136, 138 of the rotating plate, respectively. The height of the brush material extending from the body section of the brush seals 128, 130 may be as small as approximately 0.0625 inch (e.g., in a range of approximately 0.0375-0.0875 inch) in certain embodiments. In addition, in certain embodiments, the brush material may be made out of a PEEK material with a fiber diameter of approximately 0.006 inch (e.g., in a range of approximately 0.004-0.008 inch). PEEK fiber meets the thermal requirements of the rotating compressor valve 78 and, perhaps more importantly, is an anti-static charge material. As such, sealing the slot interfaces with the brush seals 128, 130 provides an efficient seal that ensures operational success of the rotating compressor valve 78.

As described above, the speed of continuous rotation of the rotating plate 84 relative to the stationary front and rear plates 80, 82 may be synchronized with the speed of cyclic compression of the reciprocating compressor 10 within which the rotating compressor valve 78 is operating. As described above, the rotating plate 84 rotates at a constant angular velocity. Therefore, precise timing of the open and closed durations based on the displacement of the pistons 36 within the compression cylinders 12 of the reciprocating compressor 10 is desired. For example, the instant the pressure in the compression chamber 52, 54 exceeds the discharge line pressure, the slots 94, 96 may align in an open position. When the piston 36 completes its compression stroke, the slots 94, 96 may close to provide a seal for the expansion stroke.

Figure 12A:
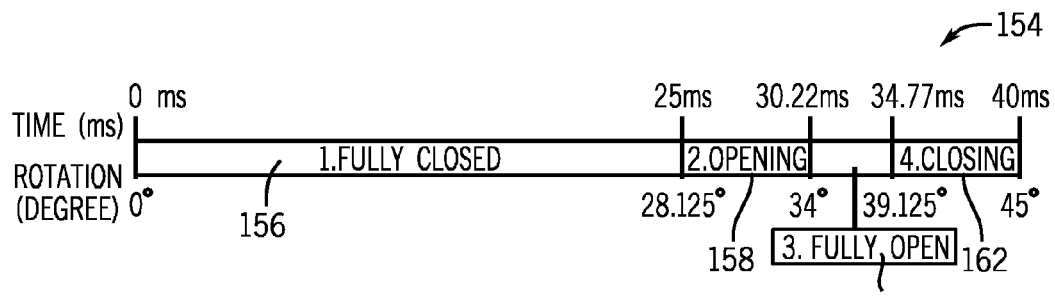
FIG. 12A is an exemplary timeline of four stages of operation of an exemplary embodiment of the rotating compressor valve.
Figure 12B:
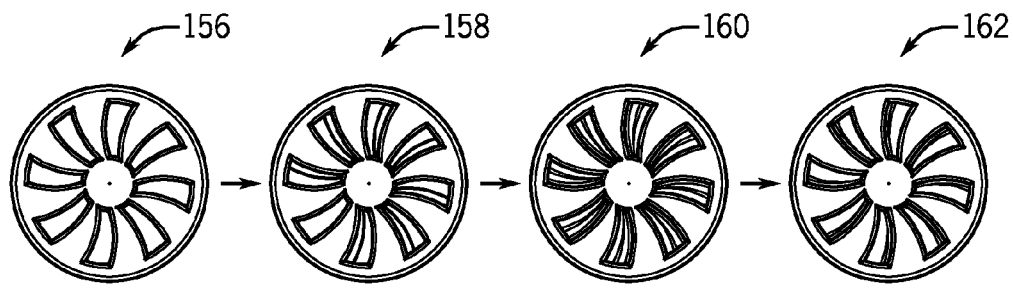
FIG. 12B is a bottom view of an exemplary embodiment of the rotating compressor valve in each of the four stages of operation.

FIG. 12A is an exemplary timeline 154 of four stages 156, 158, 160, 162 of operation of an exemplary embodiment of the rotating compressor valve 78, and FIG. 12B is a bottom view of an exemplary embodiment of the rotating compressor valve 78 in each of the four stages 156, 158, 160, 162 of operation. More specifically, FIGS. 12A and 12B illustrate a fully closed stage 156, an opening stage 158, a fully open stage 160, and a closing stage 162 of the rotating compressor valve 78. It should be noted that the angle and timing numerical examples illustrated in FIG. 12A are merely exemplary and not intended to be limiting. As illustrated in the example depicted in FIG. 12A, at approximately 1,500 rpm, a complete cycle in the reciprocating compressor 10 may take approximately 40 milliseconds (ms), or approximately 20 ms per stroke. The timeline 154 displayed in FIG. 12A represents a specific arc length design based on a total discharge valve closed time of approximately 25 ms, and a total open time of approximately 15 ms. The following relationship relates the arc distance $\theta_{rot}$ (i.e., in degrees) of the slots 94 of the rotating plate 84 and the arc distance $\theta_{sta}$ (i.e., in degrees) of the slots 96 of the stationary front and rear plates 80, 82:

$$\theta_{rot} = \frac{t_{open}\left(\frac{360}{n_{slots}}\right) - (t_{open} + t_{closed})\theta_{sta}}{t_{open} + t_{closed}} \quad (1)$$

where $t_{open}$ is the amount of time desired for the rotating compressor valve 78 to be open, $t_{closed}$ is the amount of time desired for the rotating compressor valve 78 to be closed, and $n_{slots}$ is the number of slots on the rotating plate 84 and the stationary front and rear plates 80, 82. Equation 1 enables the arc distance $\theta_{rot}$ of the slots 94 of the rotating plate 84 to be evaluated based on the arc distance $\theta_{sta}$ of the slots 96 of the stationary front and rear plates 80, 82, $t_{open}$, $t_{closed}$, and $n_{slots}$. As a result, the arc geometry of the slots 94, 96 of the rotating plate 84 and the stationary front and rear plates 80, 82 may easily be modified to further optimize the rotating compressor valve 78 for use with a variety of compressor speeds. As described above, one particular geometry includes an arc distance $\theta_{sta}$ of the slots 96 of the stationary front and rear plates 80, 82 of approximately 11 degrees, and an arc distance $\theta_{rot}$ of the slots 94 of the rotating plate 84 of approximately 5.875 degrees for eight equally spaced slots 94, 96 for each of the stationary front and rear plates 80, 82 and the rotating plate 84.

Returning now to FIG. 5, a motor 164 (e.g., a direct current (DC) motor, a gas hydraulic motor, and so forth) may be used to provide the continuous rotation of the rotating plate 84 relative to the stationary front and rear plates 80, 82. In certain embodiments, the motor 164 may be powered and controlled by a controller 166, which synchronizes the operating speed of the rotating plate 84 with the piston displacement of the reciprocating compressor 10. Assuming that eight slots 94, 96 are used in the rotating plate 84 and the stationary front and rear plates 80, 82, the operating speed of the rotating compressor valve 78 may be approximately eight times lower than the operating speed of the reciprocating compressor 10. For example, a reciprocating compressor 10 operating at 1,500 rpm may be associated with rotating compressor valves 78 operating at a speed of approximately 187.5 rpm (i.e., 1,500 rpm divided by eight).

In certain embodiments, the controller 166 may include a processor and memory. The controller 166 may be configured to determine an appropriate operating speed for the rotating compressor valve 78 (and by extension, the motor 164) based on signals received from the reciprocating compressor 10 relating to the cyclic displacement of the pistons 36 within the compression cylinders 12. Using the determined operating speed for the rotating compressor valve 78 (and by extension, the motor 164), the controller 166 may also be configured to control the speed of the motor 166 accordingly. To this end, the controller 166 may include software and/or circuitry configured to execute a suitable control routine. In certain embodiments, the control routine and/or data used by the control routine based on signals from the reciprocating compressor 10 may be stored in non-transitory memory or another computer-readable medium.

Figure 13:
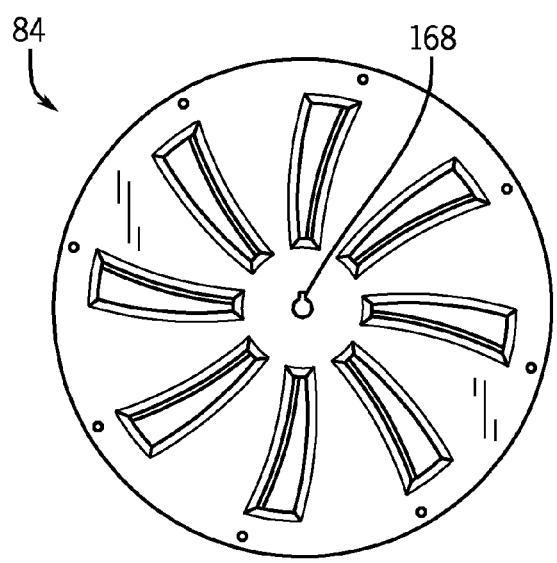
FIG. 13 is a bottom view of an exemplary embodiment of the rotating plate, illustrating a keyhole to which the motor may be coupled.

In certain embodiments, the motor 164 may be flange mounted to the stationary rear plate 82 of the rotating compressor valve 78. The mounting of the motor 164 to the stationary rear plate 82 fixes the motor 164 relative to the rotating compressor valve 78. In addition, in certain embodiments, the motor 164 may be directly connected to the rotating plate 84 via a keyhole. FIG. 13 is a bottom view of an exemplary embodiment of the rotating plate 84, illustrating a keyhole 168 to which the motor 164 may be coupled. In certain embodiments, the outer diameter of the motor 164 is approximately equal to or less than the inner slot radius 98 of the rotating compressor valve 78 to ensure that the motor 164 does not disturb the flow of fluid through the rotating compressor valve 78. In addition, the motor 164 that is used to cause rotation of the rotating plate 84 may be Class 1—Division II approved, such that the motor 164 can withstand temperatures up to and including 400° F., and will not produce an ignition source during operation of the rotating compressor valve 78. In addition, in certain embodiments, the motor 164 may be thermally insulated. For example, an outer jacket may be slipped over the motor housing, or the insulation may be located internal to the motor 164. Thermally insulating the motor 164 will ensure reliable operation and extend the life of the motor 164. Furthermore, in certain embodiments, a temperature sensor 170 (see FIG. 5) may also be placed in the motor housing to ensure that the temperature does not surpass operating limits of the motor 164. The controller 166 may monitor signals from the temperature sensor 170. In addition, in certain embodiments, the motor 164 may contain samarium cobalt magnets, which exhibit stable magnetic flux at high temperatures.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a rotating compressor valve, comprising:
a first circular plate having a first plurality of slots extending axially through the first circular plate;
a second circular plate having a second plurality of slots extending axially through the second circular plate, wherein the first circular plate is fixed relative to the second circular plate, and the first plurality of slots are aligned circumferentially with respect to the second plurality of slots; and
a third circular plate disposed axially between the first and second circular plates, wherein the third circular plate comprises a third plurality of slots extending axially through the third circular plate, and the third circular plate is configured to rotate relative to the first and second circular plates, wherein the rotating compressor valve comprises at least one of:
at least one slot of the first, second, or third plurality of slots comprises opposite radially extending edges that curve in a radial direction between an inner radius and an outer radius; or
at least one slot of the third plurality of slots comprises opposite edges that taper in common directions away from a rotational axis from a first side to a second side of the third circular plate;
or a combination thereof.

2. The system of claim 1, wherein each slot of the first, second, and third plurality of slots comprise a convex first edge extending radially from the inner radius to the outer radius, a concave second edge extending radially from the inner radius to the outer radius, an inner edge extending circumferentially from the convex first edge to the concave second edge at the inner radius, and an outer edge extending circumferentially from the convex first edge to the concave second edge at the outer radius.

3. The system of claim 2, wherein each slot of the third plurality of slots of the third circular plate includes an arc radius offset between the convex first edge and the concave second edge that is smaller than a corresponding arc radius offset between the convex first edge and the concave second edge for each slot of the first and second pluralities of slots.

4. The system of claim 2, wherein the convex first edge, the concave second edge, the inner edge, and the outer edge of each slot of the first and second pluralities of slots are chamfered such that faces of the convex first edge, the concave second edge, the inner edge, and the outer edge open away from the third circular plate.

5. The system of claim 2, wherein the convex first edge and the concave second edge of the third plurality of slots include a constant taper angle in the common direction.

6. The system of claim 1, wherein the rotating compressor valve comprises a first plurality of brush seals disposed axially between the first circular plate and the third circular plate, and a second plurality of brush seals disposed axially between the second circular plate and the third circular plate.

7. The system of claim 6, wherein each brush seal of the first plurality of brush seals is disposed within one of a first plurality of grooves in the first circular plate extending radially from the inner radius of the rotating compressor valve to the outer radius of the rotating compressor valve along a first radially extending edge of a first slot of the first plurality of slots, and each brush seal of the second plurality of brush seals is disposed within one of a second plurality of grooves in the second circular plate extending radially from the inner radius to the outer radius along a second radially extending edge of a second slot of the second plurality of slots.

8. The system of claim 7, wherein the first circular plate comprises two of the first plurality of grooves disposed on opposite circumferential sides of each of the first plurality of slots, and the second circular plate comprises two of the second plurality of grooves disposed on opposite circumferential sides of each of the second plurality of slots.

9. The system of claim 1, wherein the rotating compressor valve comprises a first inner babbitt seal disposed axially between the first circular plate and the third circular plate along the inner radius, a first outer babbitt seal disposed axially between the first circular plate and the third circular plate along the outer radius, a second inner babbitt seal disposed axially between the second circular plate and the third circular plate along the inner radius, and a second outer babbitt seal disposed axially between the second circular plate and the third circular plate along the outer radius.

10. The system of claim 9, wherein the first inner and outer babbitt seals each comprise a first annular ring of babbitt material sprayed onto the first circular plate and a first plurality of babbitt teeth attached to the third circular plate and radially aligned with the first annular ring of babbitt material, and the second inner and outer babbitt seals each comprise a second annular ring of babbitt material sprayed onto the second circular plate and a second plurality of babbitt teeth attached to the third circular plate and radially aligned with the second annular ring of babbitt material.

11. The system of claim 1, comprising a direct current (DC) motor configured to cause continuous rotation of the third circular plate relative to the first and second circular plates.

12. The system of claim 11, comprising a controller configured to control the DC motor such that a speed of continuous rotation of the third circular plate is synchronized with a speed of cyclic compression of a compressor within which the rotating compressor valve operates.

13. The system of claim 1, wherein the rotating compressor valve comprises:
  at least one slot of the first, second, or third plurality of slots comprises opposite radially extending edges that curve in the radial direction between the inner radius and the outer radius;
  at least one slot of the third plurality of slots comprises opposite edges that taper in the common directions away from the rotational axis from the first side to the second side of the third circular plate; and
  at least one slot of the third plurality of slots is sized smaller than each of the first plurality of slots and each of the second plurality of slots.

14. The system of claim 1, wherein the rotating compressor valve comprises:
  at least one slot of the first, second, or third plurality of slots comprises opposite radially extending edges that curve in the radial direction between the inner radius and the outer radius.

15. The system of claim 1, wherein the rotating compressor valve comprises:
  at least one slot of the third plurality of slots comprises opposite edges that taper in the common directions away from the rotational axis from the first side to the second side of the third circular plate.

16. The system of claim 15, wherein the opposite edges taper in the common directions away from the rotational axis parallel to one another between the first and second sides of the third circular plate.

17. The system of claim 1, wherein the rotating compressor valve comprises:
  at least one slot of the third plurality of slots is sized smaller than each of the first plurality of slots and each of the second plurality of slots.

18. The system of claim 1, wherein the rotating compressor valve comprises:
  each slot of the first, second, and third plurality of slots comprises opposite radially extending edges that curve in the radial direction between the inner radius and the outer radius;
  each slot of the third plurality of slots comprises opposite edges that taper in the common directions away from the rotational axis from the first side to the second side of the third circular plate; and
  each slot of the third plurality of slots is sized smaller than each of the first plurality of slots and each of the second plurality of slots.

19. A system, comprising:
  a compressor, comprising:
  a rotating compressor valve, comprising:
  a first circular plate having a first plurality of slots extending axially through the first circular plate;
  a second circular plate having a second plurality of slots extending axially through the second circular plate, wherein the first circular plate is fixed relative to the second circular plate, and the first plurality of slots are aligned circumferentially with respect to the second plurality of slots; and
  a third circular plate disposed axially between the first and second circular plates, wherein the third circular plate comprises a third plurality of slots extending axially through the third circular plate, and the third circular plate is configured to rotate relative to the first and second circular plates, wherein the rotating compressor valve comprises at least one of:
  at least one slot of the first, second, or third plurality of slots comprises opposite radially extending edges that curve in a radial direction between an inner radius and an outer radius; or
  at least one slot of the third plurality of slots comprises opposite edges that taper in common directions away from a rotational axis from a first side to a second side of the third circular plate;
  or a combination thereof.

20. The system of claim 19, wherein each slot of the first, second, and third plurality of slots comprise a convex first edge extending radially from the inner radius to the outer radius, a concave second edge extending radially from the inner radius to the outer radius, an inner edge extending circumferentially from the convex first edge to the concave second edge at the inner radius, and an outer edge extending circumferentially from the convex first edge to the concave second edge at the outer radius, wherein each slot of the third plurality of slots of the third circular plate includes an arc radius offset between the convex first edge and the concave second edge that is smaller than a corresponding arc radius offset between the convex first edge and the concave second edge for each slot of the first and second pluralities of slots, and wherein the convex first edge and the concave second edge of the third plurality of slots include a constant taper angle in the common direction.

21. The system of claim 19, comprising a first plurality of brush seals disposed axially between the first circular plate and the third circular plate, and a second plurality of brush seals disposed axially between the second circular plate and the third circular plate.

22. The system of claim 19, comprising a first inner babbitt seal disposed axially between the first circular plate and the third circular plate along the inner radius, a first outer babbitt seal disposed axially between the first circular plate and the third circular plate along the outer radius, a second inner babbitt seal disposed axially between the second circular plate and the third circular plate along the inner radius, and a second outer babbitt seal disposed axially between the second circular plate and the third circular plate along the outer radius.

23. The system of claim 19, comprising:
a direct current (DC) motor configured to cause continuous rotation of the third circular plate relative to the first and second circular plates; and
a controller configured to control the DC motor such that a speed of continuous rotation of the third circular plate is synchronized with a speed of cyclic compression of the compressor within which the rotating compressor valve operates.

24. A method, comprising:
opening a flow path through a compressor by rotating a rotating plate within two stationary plates of a rotating compressor valve to circumferentially align slots in extending axially through the rotating plate with complimentary slots extending axially through the two stationary plates; and
closing the flow path through the compressor by rotating the rotating plate within the two stationary plates to circumferentially align the slots in the rotating plate with the complimentary slots in the two stationary plates, wherein the rotating compressor valve comprises at least one of:
at least one slot of the slots in the rotating plate or the complimentary slots in the two stationary plates comprises opposite radially extending edges that curve in a radial direction between an inner radius and an outer radius; or
at least one slot of the slots in the rotating plate comprises opposite edges that taper in common directions away from a rotational axis from a first side to a second side of the rotating plate;
or a combination thereof.

* * * * *